(12) United States Patent
Krishnamurthy et al.

(10) Patent No.: US 8,589,951 B2
(45) Date of Patent: Nov. 19, 2013

(54) CONSERVING MEMORY BY USING OBJECTS THAT ARE SELECTABLY MUTABLE DURING RUNTIME

(75) Inventors: Jayatheerthan Krishnamurthy, Bangalore (IN); Shettigar Srinivas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/986,365

(22) Filed: Jan. 7, 2011

(65) Prior Publication Data

US 2012/0180074 A1    Jul. 12, 2012

(51) Int. Cl.
  *G06F 3/00*     (2006.01)
  *G06F 9/44*     (2006.01)
  *G06F 9/46*     (2006.01)
  *G06F 13/00*    (2006.01)

(52) U.S. Cl.
  USPC .......................................... 719/318; 719/313

(58) Field of Classification Search
  None
  See application file for complete search history.

(56) References Cited

U.S. PATENT DOCUMENTS

| | | | |
|---|---|---|---|
| 7,219,340 B2 | 5/2007 | Schechter et al. | |
| 2005/0091637 A1* | 4/2005 | Schechter et al. | 717/110 |
| 2005/0289652 A1* | 12/2005 | Sharma et al. | 726/26 |
| 2009/0031292 A1 | 1/2009 | Fulton et al. | |
| 2009/0327723 A1* | 12/2009 | Yates et al. | 713/168 |

OTHER PUBLICATIONS

"Defensive copying," Hirondelle Systems, 2010 <http://www.javapractices.com/topic/TopicAction.do?Id=15>, pp. 1-3.
Mohindra et al., "OBJ11-J. Defensively copy private mutable class members before returning their references," Software Engineering Institute, Carnegie Mellon, 1995-2009, <http://webcache.googleusercontent.com/search?q=cache:v_6jWtgbtusJ:https://www.securecoding.cert.org/confluence/display/java/OBJ11-J.%2BDefensively%2Bcopy%2Bprivate%2Bmutable%2Bclass%2Bmembers%2Bbefore%2Breturning%2Btheir%2Breferences>, pp. 1-8.
"Immutability after dependency injection, initialization," Stack Overflow Internet Services, Inc., <http://stackoverflow.com/questions/2908207/immutability-after-dependency-injection-initialization>, pp. 1-4.
Haack et al., "Immutable Objects for a Java-like Language," <http://www.cs.ru.nl/~chaack/slides/papers/imm-obj.pdf>, pp. 1-15.
"Interface Lock," <http://java.sun.com/j2se/1.5.0/docs/api/java/util/concurrent/locks/Lock.html>, pp. 1-7.
Zibin et al., "Object and Reference Immutability using Java Generics," ESEC-FSE Proceedings of the 6th joint meeting of the European software engineering conference and the ACM SIGSOFT symposium on The foundations of software engineering, 2007: <http://delivery.acm.org/10.1145/1290000/1287637/p75-zibin.pdf?key1=1287637&key2=1279012821&coll=GUIDE&dl=GUIDE&CFID=98500685&CFTOKEN=58716981>, pp. 75-84.

(Continued)

*Primary Examiner* — H S Sough
*Assistant Examiner* — Craig Dorais
(74) *Attorney, Agent, or Firm* — Patterson & Sheridan, LLP

(57) ABSTRACT

Techniques are disclosed for providing support for objects that are selectably mutable during runtime. In one embodiment, an application programming interface (API) is provided that includes procedures for sealing and unsealing an object during runtime. Applications may use the API to prevent the object from being inadvertently modified, without having to create defensive copies of the object. Accordingly, processing and/or memory costs associated with executing the application may be reduced.

12 Claims, 5 Drawing Sheets

(56) References Cited

OTHER PUBLICATIONS

Eyal Schneider, "Parameters and returned values," The Java Explorer, Blog at WordPress.com, Feb. 2010: <http://eyalsch.wordpress.com/2010/02/11/refdamage/>, pp. 1-9.

Michael D. Ernst, "Type Annotations Specification (JSR 308)," Jul. 2010: <http://types.cs.washington.edu/jsr308/specification/java-annotation-design.pdf>, pp. 1-43.

Boyland, "Why we should not add readonly to Java (yet)*," University of Wisconsin—Milwaukee: <http://www.cs.uwm.edu/~boyland/papers/readonly.html>, pp. 1-13.

* cited by examiner

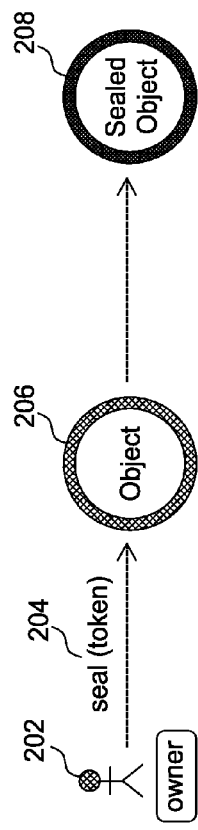
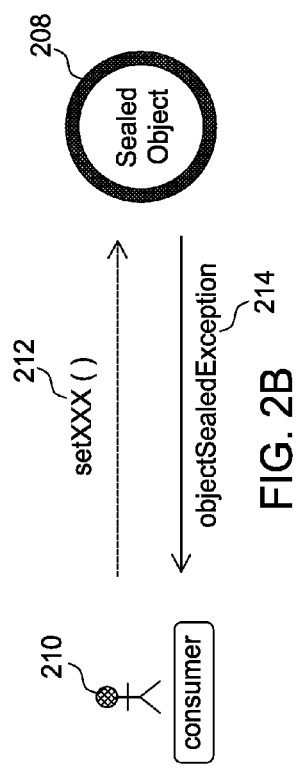
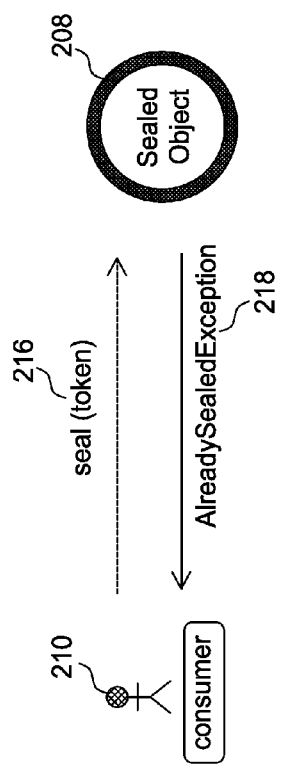

CONSERVING MEMORY BY USING OBJECTS THAT ARE SELECTABLY MUTABLE DURING RUNTIME

BACKGROUND

Computer systems typically include operating system software that controls basic function of the computer, and one or more software application programs that run under the control of the operating system to perform desired tasks. For example, a typical IBM® Personal Computer may run the OS/2® operating system, and under the control of the OS/2® operating system, a user may execute an application program, such as a word processor. As the capabilities of computer systems have increased, the software programs designed for these high performance systems have become more powerful. Additionally, software development costs have continued to rise because more powerful and complex programs take more time to produce.

One way in which the performance of application software programs has been improved while the associated development costs have been reduced is by using object-oriented programming concepts. One goal of object-oriented programming is to create small, reusable sections of program code—known as objects—that can be quickly and easily combined and re-used to create new programs. This is similar to the idea of using the same set of building blocks again and again to create many different structures. The modular and re-usable aspects of objects typically speed development of new programs, thereby reducing the costs associated with the software development cycle. In addition, by creating and re-using a group of well-tested objects, a more stable, uniform, and consistent approach to developing new computer programs can be achieved.

SUMMARY

Embodiments of the invention provide a computer-implemented method, computer program product and system for performing an operation that includes receiving a first request to seal an object during runtime, wherein the object includes one or more attributes. The operation also includes sealing the object in response to the first request, wherein the sealed object is configured to cause an exception to be thrown upon any attempt to modify any of the one or more attributes of the sealed object.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 2A-2E illustrate usage of an API library that supports dual-state objects, according to one embodiment of the invention.

DETAILED DESCRIPTION

Figure 1:
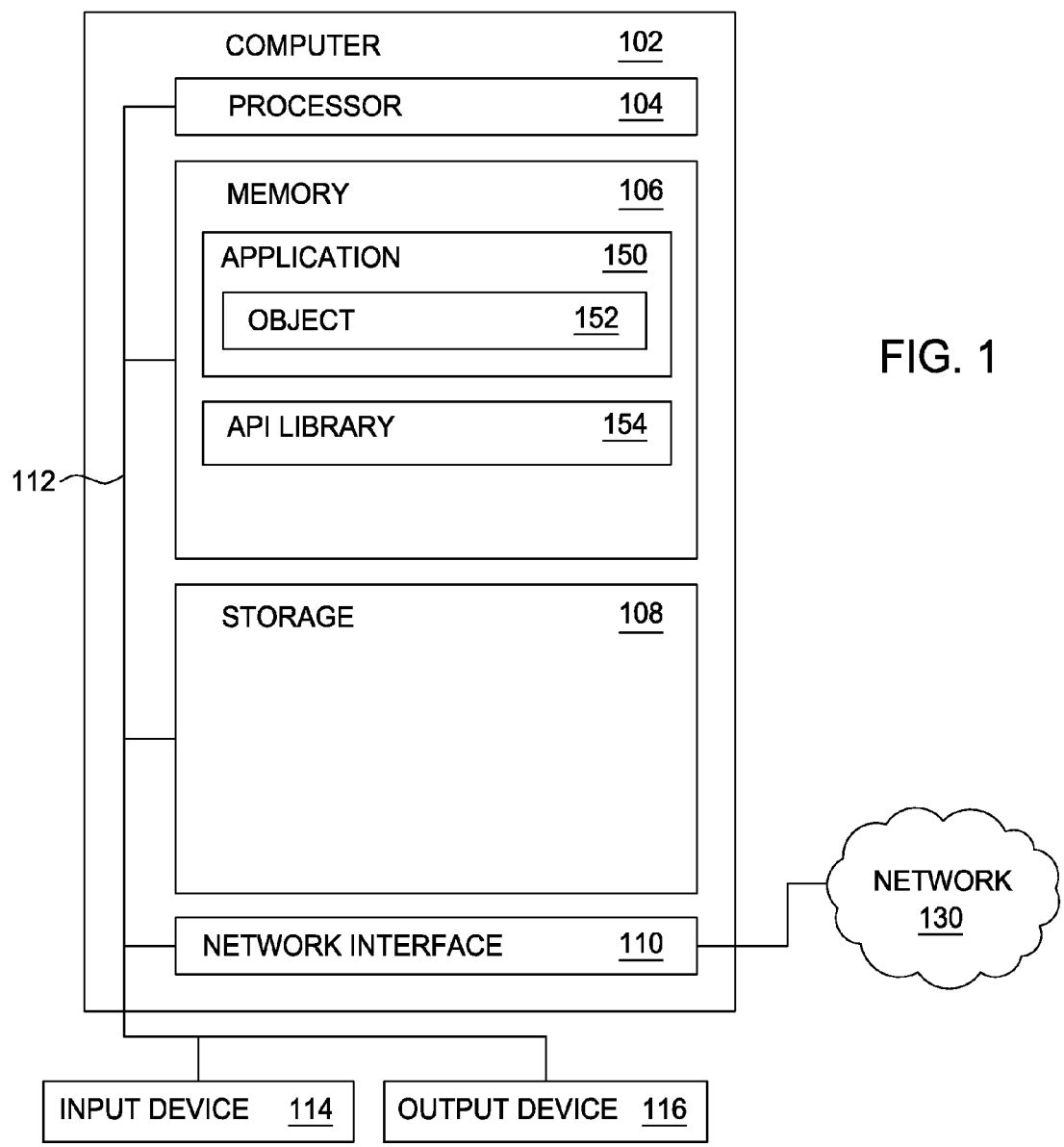
FIG. 1 is a block diagram illustrating a system that supports dual-state objects, according to one embodiment of the invention.

Embodiments of the invention provide techniques for conserving memory by using objects that are selectably mutable during runtime. One embodiment of the invention provides an application programming interface (API) for switching between a mutable state and an immutable state of an object during time. The mutable/immutable state of an object determines whether the object may be modified. Objects supporting switching between mutable-immutable states during runtime are herein referred to as dual-state objects. An object-oriented application may use the API to create and manage dual-state objects. By using the API, a developer of the application may reduce a likelihood of errors resulting from inadvertent modification of an object, without having to incur memory and/or processing costs associated with performing defensive copying of the object, and without having to declare the object as mutable (or immutable) before runtime (e.g., at or before compile time).

In one embodiment, inadvertent modification of an object refers to the object being modified by code in a way that violates an assumption under which other code operates (in other words, in a way that breaks encapsulation). Encapsulation refers to concealing the functional details of a class from objects that send messages to the class. Defensive copying of an object refers to cloning the object when the object is passed from code in the application (e.g., a first object or class) to other code in the application (e.g., a second object or class), such that even if the cloned object is modified by the other code, an unmodified copy of the object is retained. Declaring an object as mutable (or immutable) at compile time results in a respective state that is fixed over the life cycle of the object. By not requiring the developer to designate an object as mutable (or immutable) at compile time, the mutable/immutable state of an object may be modified during runtime, thereby providing the developer with improved flexibility in developing applications to meet business needs. At least in some cases, the API may be extended to support dual-state objects, without having to forgo support for dynamic polymorphism. Dynamic polymorphism refers to selection of a method for execution based on an actual type of the object whose reference is stored in a reference variable, rather than the declared type of the reference variable on which the method is invoked.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may request to execute an application in the cloud, where the cloud provides an API that supports dual-state objects. For example, the cloud may provide an application server that supports the API. To the extent that the application uses dual-state objects, the processing and/or memory costs associated with executing the application in the cloud may be reduced relative to a scenario in which the API does not support dual-state objects. Having the application execute in the cloud allows the user to manage execution of the application from any computing system attached to a network connected to the cloud (e.g., the Internet).

As described above, the cloud may provide an application server that supports the API. The application server may provide services to applications for security, state maintenance, data access and persistence, via one or more application programming interfaces (APIs). In one embodiment, the application server conforms to the Java Platform, Enterprise Edition (Java EE). As is known, Java EE is a widely used platform for server programming in the Java™ programming language. The Java EE-compliant application server may include one or more containers, such as a Servlet container and an Enterprise JavaBeans (EJB) container, and may provide services such as Java Naming and Directory Interface (JNDI), Java Message Service (JMS), and connection pooling.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 that supports dual-state objects, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 and an API library 154. The application 150 uses at least an object 152. In one embodiment, the API library 154 provides procedures for managing a mutable/immutable state of the object 152. Using the Java™ programming language as an example, an API for java.lang.Object may be extended to provide seal( ) and unseal( ) methods. In a Java application, a native class of an object may call the seal ( ) method to seal the object 152. Sealing the object 152 switches the object 152 from a mutable state to an immutable state during runtime (i.e., during execution of the application). A native class (or owner) of an object 152 refers to a class that creates the object 152. A calling class (or consumer) of an object 152 refers to any class that does not create the object 152 but that includes code that uses the object 152, either by directly accessing the object 152 or by calling a method in the native class to access the object 152.

In one embodiment, by using the API library 154, the application 150 may prevent inadvertent modification of the object 152 without having to create defensive copies of the object 152 and without having to declare the object 152 as mutable or as immutable at compile time (i.e., during compilation of the application). Because defensive copies of the object 152 need not be created, memory and/or processing costs from executing the application 150 may be conserved. Further, because the mutable/immutable state of the object 152 may be changed at runtime, the developer of the application 150 is provided with improved flexibility in developing the application to meet business needs.

Further, depending on the embodiment, a virtual machine (not shown) executing on the computer 102 receives bytecode and converts bytecode into the application 150 for execution by the processor 104. Bytecode refers to a type of instruction set designed for being executed efficiently by a software interpreter and being suitable for further compilation into machine code. A virtual machine refers to any software implementation of a machine (i.e., a computer) that executes instructions like a physical machine. An example of the virtual machine is the Java Virtual Machine (JVM). Further, the API library may be the Java Class Library. As is known, the Java Class Library refers to a set of dynamically loadable libraries that Java applications can call at runtime. (Because the Java Platform is not dependent on any specific operating system, applications cannot directly rely on any of the operating-system-provided libraries.) Together, the JVM and the Java Class Library constitute the Java Runtime Environment (JRE). A developer can use a software development kit, such as the Java Development Kit (JDK), to create applications that execute using the JRE.

Those skilled in the art, however, will recognize that the techniques disclosed herein are applicable to development and/or execution of any object-oriented application, including environments that do not contain any virtual machine component. Developing an object-oriented application refers to creating an application using any conventional or custom object-oriented programming language. Executing an object-oriented application refers to executing an application that is developed using any conventional or custom object-oriented programming language. An object-oriented programming language refers to any programming language that supports one or more features of the object-oriented programming (OOP) paradigm, such as data abstraction, encapsulation, modularity, polymorphism and inheritance. At least in some embodiments, the application is not developed using functional programming or declarative programming.

Still other embodiments are broadly contemplated by the disclosure. For example, although the application 150 is shown to be executing on a single computer 102, the techniques disclosed herein are applicable to a distributed, object-oriented application that executes on multiple computers connected via the network 130. Further, although embodiments are herein described with reference to sharing an object within a single application 150, the techniques herein may be adapted for different applications communicating with one another. For example, applications that use shared memory may pass a dual-state object to one another using the techniques described herein. As another example, applications that adhere to the Common Object Request Broker Architecture (CORBA) standard may communicate with one another over a network via the Internet Inter-Orb Protocol (IIOP) to pass a dual-state object to one another, using the techniques described herein. CORBA refers to a mechanism in software for normalizing method-call semantics between application objects residing either in the same address space (e.g., the address space of an application) or remote address space (other address space on the same host, or any address space on a remote host over a network).

Further still, the techniques disclosed herein may be used for creating software caches that incur reduced processing and/or memory costs. A software cache allows an application to execute more efficiently by caching one or more objects used by the application. Depending on the embodiment, the software cache may be included as a component of an application server. An example of a software cache is the Object-Grid component of the IBM® WebSphere® Application Server.

More specifically, in one embodiment, the techniques disclosed herein may be used in creating read-only caches that return immutable objects. Read-only caches may often clone a cached object before returning the cached object to a consumer. However, cloning the cached object increases the number of object instances in the JVM, thus increasing memory and processor usage. In one embodiment, instead of cloning each cached object, the read-only cache is configured to seal each cached object before returning the respective cached object to the consumer. In other words, the master copy of each cached object is shared with the consumer, while ensuring that the consumer cannot modify the master copy. If the consumer desires to modify the cached object, the consumer may clone the cached object and modify the clone.

Advantageously, read-only caches that support dual-state objects facilitate the operation of memory-efficient, performance-efficient and/or mutation-safe applications. In particular, read-only caches that support dual-state objects consume less memory because references to master copies (as opposed to clones) are returned to consumers. Further, fewer processor cycles are used for operation of the read-only caches that support dual-state objects, because the objects need not be copied in memory during a cache lookup. Fewer garbage collection cycles and reduced memory reallocation may also result from the read-only caches that support dual-state objects.

In one embodiment, the techniques disclosed herein may also be used in safeguarding method parameters from mutation. Arguments passed to a method may be inadvertently mutated by the called method and may violate assumptions under which the caller is operating, thereby resulting in erroneous and/or unpredictable behavior of the application 150. Further, the caller may not know whether the called method is applying defensive copying techniques on the arguments. Accordingly, in one embodiment, the caller seals the object using the dual-state object approach. Advantageously, the caller thereby prevents inadvertent mutations by the invoked method.

FIGS. 2A-2E illustrate usage of the API library 154 of FIG. 1, according to one embodiment of the invention. As described above, the application 150 may use the API library 154 to reduce a likelihood of inadvertent modification of the object 152. For example, an owner of an object may use the API library 154 to prevent a consumer of the object from modifying the object. As used herein, modifying an object refers to altering any attribute of the object. The API library 154 may provide one or more mechanisms to ensure that only the owner may seal and/or unseal the object. For example, the API library 154 may specify that a unique key is required to seal an object and that the same key is required to successfully unseal the object. Accordingly, the owner of the object may generate a key and seal the object using the key. For example, the owner of the object may generate using a predefined function, such as a random or pseudorandom function. Without the key, consumers of the object may not modify or unseal the object. By doing this, the owner of the object thereby reduces a likelihood that the object is modified by a consumer.

Figure 2D:
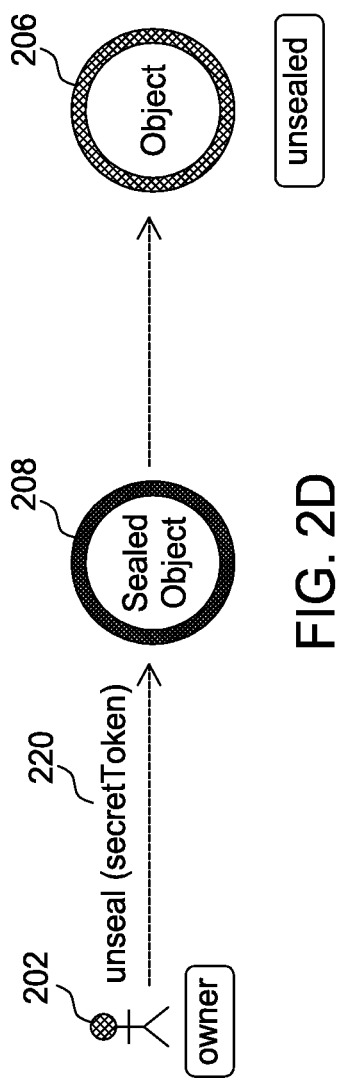
Figure 2E:
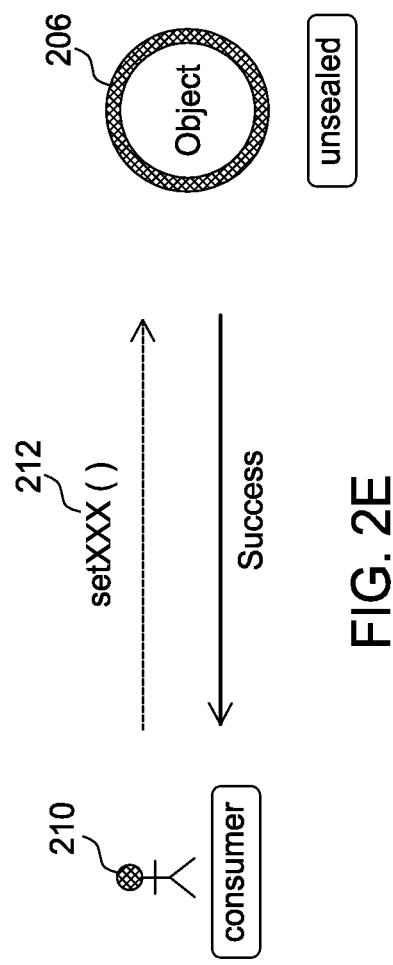

As shown in FIG. 2A, an owner 202 of an object 206 may seal the object 206 by calling the seal( ) method 204 and supplying a first token, resulting in a sealed object 208. Referring to FIG. 2B, if a consumer 210 of the sealed object 208 subsequently attempts to modify the sealed object 208 (e.g., by calling a setXXX( ) method 212), the API library 154 throws an "object sealed" exception 214. In other words, the modification attempt is unsuccessful because the object has been sealed by the owner 202. Referring now to FIG. 2C, if the consumer 210 attempts to seal the object 208 and supply a token, the API library 154 throws an "already sealed" exception 218. As shown in FIG. 2D, the owner 202 may subsequently unseal the object 208 by calling the unseal( ) method 220 and supplying a second token, resulting in the (unsealed) object 206 if the second token matches the first token used in FIG. 2A. Referring to FIG. 2E, the consumer 210 may then successfully modify the unsealed object 206 (e.g., by calling the setXXX( ) method 212).

In one embodiment, once an exception is thrown, control flow of the application may change from code in the application throwing the exception (or, alternatively, code in the API library 154 called by the code in the application and throwing the exception) to an exception handler—i.e., code in the application configured to handle the exception. Exception handling refers to a programming language construct or computer hardware mechanism designed to handle the occurrence of exceptions, special conditions that change the normal flow of program execution. The special conditions may also include one or more error conditions that are predefined by a developer of the application. Control flow refers to an order in which individual statements, instructions or function calls of an application are executed or evaluated.

Figure 3:
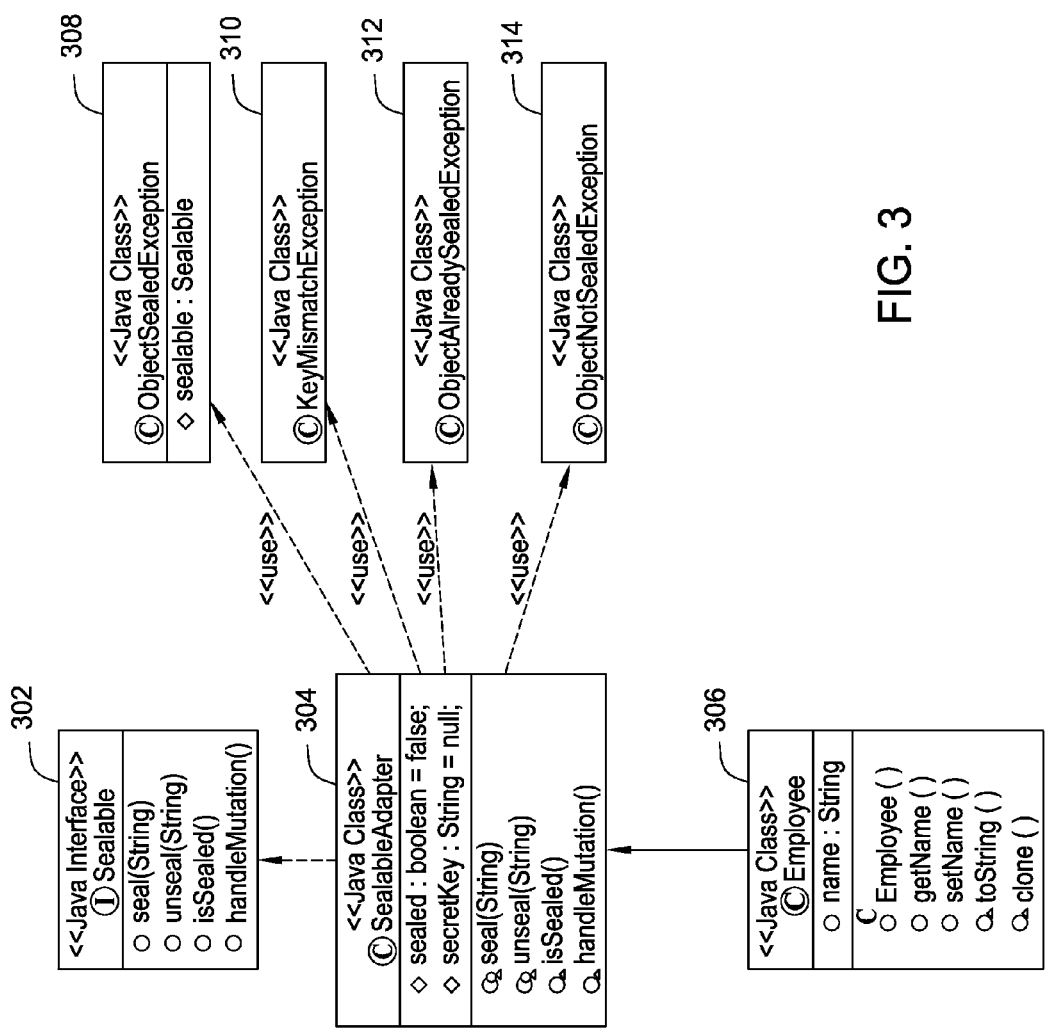
FIG. 3 illustrates class definitions for the API library, according to one embodiment of the invention.

FIG. 3 illustrates class definitions for the API library 154 of FIG. 1, according to one embodiment of the invention. Although the class definitions are described herein with reference to the Java™ programming language, embodiments of the invention may be adapted for use with any conventional or custom programming language. As shown, each attribute of an object that is intended to conform in behavior to the mutable/immutable state of the object should be marked as a private attribute. As is known, private attributes of a class in Java™ can only be accessed by other members of the class. The sealable class, e.g., the Employee class 306, should either: (i) extend from the SealableAdapter class 304 or (ii) implement the Sealable interface 302 and provide concrete definitions of the methods of the interface. Both the SealableAdapter class 304 and the Sealable interface 302 specify the following methods: seal(String), unseal(String), isSealed( ), and handleMutation( ).

In one embodiment, the SealableAdapter class 304 also specifies the following attributes: (i) a boolean sealed that is initialized to false and (ii) a String secretKey that is initialized to null. The Boolean sealed is a flag that specifies whether the object is sealed. Further still, public setter methods are not provided for the flag; instead, the flag is modified only through the seal( ) and unseal( ) methods. A setter method refers to a method for setting (e.g., modifying) a corresponding member variable in the class, where the setter method is named by concatenating "set" and the name of the corresponding member variable. Further, as described above, both the seal( ) and unseal( ) methods accept a key as a String argument, where the key is used to seal or unseal the object. The key may be an alphanumeric key that is generated by the owner of the object and that is not known to any consumer of the object. If the key used for unsealing matches the key previously used for sealing, then the unsealing is successful and no exception is thrown. Otherwise, the unsealing is unsuccessful and a "key mismatch" exception 310 is thrown. If the seal( ) method is called on the sealed object, then an "object already sealed" exception 312 is thrown. If the unseal( ) method is called on an unsealed object, then an "object not sealed" exception 314 is thrown.

In one embodiment, the class implementing the Sealable interface implements a clone( ) method to create a deep copy of the object. A deep copy of the object is distinguished from a shallow copy of the object as follows. A shallow copy of an object copies all member fields of the object. If one of the member fields points to dynamically allocated memory, only the pointer is copied and not the contents of the dynamically allocated memory. In contrast, a deep copy of an object copies all member fields and makes copies of any dynamically allocated memory pointed to by the member fields, thereby eliminating any data dependencies between the deep copy and the object. Further, the clone( ) method also unseals the cloned object. Upon each attempt to modify the object, the handleMutation( ) method is called, which throws an "object sealed" exception 308 if the object is sealed (whereby the attempt is unsuccessful). Still further, all setter methods of attributes that are intended to conform in behavior to the mutable/immutable state of the object should invoke the handleMutation( ) method at the beginning of the definition of the respective setter method.

Invoking the handleMutation( ) method may be implemented by using various approaches. Examples of these approaches include a runtime annotation approach and a manual code introduction approach. Under the runtime annotation approach, a new annotation @preExecute is introduced, which ensures that the method name given in the annotation is invoked prior to the execution of the annotated method. A new Java Specification Request (JSR) may need to be raised to cause the JVM to interpret and execute the annotation. The annotations can be reflective in that the annotations are embedded in class files generated by the compiler and may be retained by the JVM to be made retrievable at run-time. The annotations may be processed by plugins of a compiler, when the source code is compiled. The compiler may store annotation metadata in one or more class files. Based on the metadata, the JVM and/or other applications may determine how to interact with program elements or change the behavior thereof. Table I shows exemplary source code for implementing the invocation using the runtime annotation approach:

TABLE I

First implementation example (Runtime annotation)

```
@preExecute(method=handleMutation)
public void setName(String name) {
    this.name = name;
}
```

Alternatively, invoking the handleMutation( ) method may be implemented using a manual code introduction approach. In this approach, each setter method of dual-state attributes invokes the handleMutation( ) method at the beginning of the definition of the respective setter method. Table II shows exemplary source code for implementing the invocation using the manual code introduction approach:

TABLE II

Second implementation example (manual code introduction)

```
public void setName(String name) {
    handleMutation( );
    this.name = name;
}
```

Other implementations of invoking the handleMutation( ) method are broadly contemplated. For example, in one embodiment, a third implementation provides mutation protection to each field of a class, regardless of the access specifier of the respective field. The access specifier may be public, private, protected, etc. In the third implementation, a runtime annotation @Seal is applied either at a class level or at an individual field level. When the annotation is applied at the class level, then all fields of the class exhibits dual-state behavior. On the other hand, when the annotation is applied at the field level, then only the fields for which the annotation is applied exhibits dual-state behavior. Advantageously, the third implementation does not require any changes to the compiler. Further, because the third implementation supports dynamic polymorphism, code using dynamic polymorphism can be annotated under the third implementation. Further, code compiled using third party compilers can also achieve dual-state behavior when the compiled code is executed on a Java runtime that is configured to check for annotation against classes and/or fields and to invoke calls to the handleMutation( ) method before object mutator bytecode (e.g., a putfield operation) on the annotated fields are interpreted by the JVM. Object mutator bytecode refers to bytecode instructions that are configured to modify one or more attributes of an object.

In one embodiment, a fourth implementation achieves dual-state behavior using compile-time field-level annotations. In the fourth implementation, the @Seal annotation is retained at compile time and is applied only at a field level and not at a class level, because the annotation does not support dynamic polymorphism in this implementation. Further, the compiler is modified to place calls to the handleMutation( ) method before executing the putfield operation. Although there may be a compiler dependency for the code being compiled, the JRE need not be enhanced in order for the API library 154 to support dual-state behavior. Further, because class level annotation is not supported, dual-state behavior may not be achieved for third party base class fields. At least in some cases, the fourth implementation is a suitable mechanism for achieving dual-state behavior where performance is of higher priority than runtime behavior.

Figure 4:
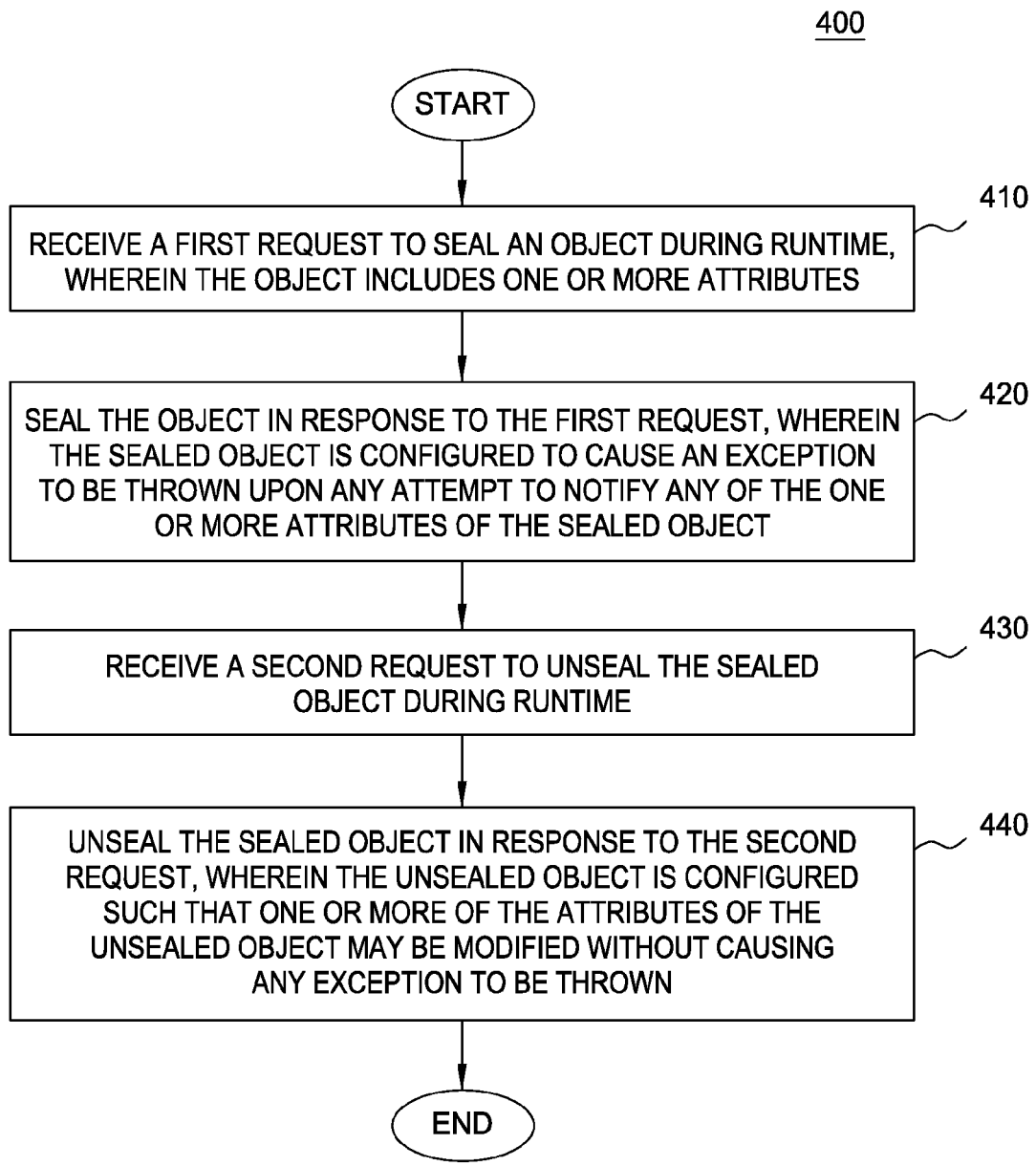
FIG. 4 is a flowchart depicting a method for managing a mutable/immutable state of an object during runtime, according to one embodiment of the invention.

FIG. 4 is a flowchart depicting a method 400 for managing a mutable/immutable state of the object 152 during runtime, according to one embodiment of the invention. As shown, the method 400 begins at step 410, where the API library 154 receives a first request from the application 150 to seal an object 152 during runtime, where the object 152 includes one or more attributes. At step 420, the API library 154 seals the object in response to the first request, where the sealed object is configured to cause an exception to be thrown upon any attempt to modify any of the one or more attributes of the sealed object. At step 430, the API library 154 receives a second request to unseal the sealed object during runtime. At step 440, the API library 154 unseals the sealed object in response to the second request, where the unsealed object is configured such that one or more of the attributes of the unsealed object may be modified without causing any exception to be thrown (e.g., by the application 150 or by the API library 154). After the step 440, the method 400 terminates.

Advantageously, embodiments of the invention provide support for objects that are selectably mutable during runtime. One embodiment of the invention provides an API that includes procedures for sealing and unsealing an object during runtime. Applications may use the API to prevent the object from being inadvertently modified, without having to create defensive copies of the object. Accordingly, processing and/or memory costs associated with executing the application may be reduced, and application developers are provided with improved flexibility in developing applications to meet business needs.

While the foregoing is directed to embodiments of the present invention, other and further embodiments of the invention may be devised without departing from the basic scope thereof, and the scope thereof is determined by the claims that follow.

What is claimed is:

1. A computer-implemented method to conserve memory by supporting objects that are selectably mutable during runtime, the method comprising:
   in response to a first request to seal an object during runtime the object including one or more attributes safeguarding against modification of the object, by operation of one or more computer processors and by sealing the object such that an exception is thrown upon any attempt to modify any of the one or more attributes of the sealed object; and
   in response to a second request to unseal the sealed object during runtime wherein the first and second requests each specify a respective key, and upon determining that the keys match, unsealing the sealed object such that no exception is thrown upon any attempt to modify any of the one or more of the attributes of the unsealed object;
   wherein an exception is thrown upon determining that the keys do not match;
   wherein modification of the object is prevented without having to declare the object as mutable or immutable during compile-time, and while avoiding any memory cost associated with performing defensive copying of the object; wherein selectable mutability of the object is implemented using a predefined seal annotation selected from a runtime seal annotation and a compile-time seal annotation, wherein the predefined seal annotation is applied at a predetermined level selected from a class level of the object and a field level of the object.

2. The computer-implemented method of claim 1, wherein the object is selectably mutable during runtime, thereby conserving memory using the object that is selectably mutable during runtime, whereby an owner of the object prevents a consumer of the object from modifying the object, without requiring the object to be copied in memory, and wherein each of the owner and the consumer comprises respective code.

3. A computer program product to conserve memory by supporting objects that are selectably mutable during runtime, the computer program product comprising:
   a computer-readable storage medium having computer-readable program code embodied therewith, the computer-readable program code comprising:
      computer-readable program code configured to, in response to receiving a first request to seal an object during runtime the object including one or more attributes safeguard against modification of the object, by operation of one or more computer processors when executing the computer-readable program code and by sealing the object such that an exception is thrown upon any attempt to modify any of the one or more attributes of the sealed object; and
      computer-readable program code configured to, in response to a second request to unseal the sealed object during runtime wherein the first and second requests each specify a respective key, and upon determining that the keys match, unseal the sealed object such that no exception is thrown upon any attempt to modify any of the one or more of the attributes of the unsealed object;
   wherein an exception is thrown upon determining that the keys do not match;
   wherein modification of the object is prevented without having to declare the object as mutable or immutable during compile-time, and while avoiding any memory cost associated with performing defensive copying of the object; wherein selectable mutability of the object is implemented using a predefined seal annotation selected from a runtime seal annotation and a compile-time seal annotation, wherein the predefined seal annotation is applied at a predetermined level selected from a class level of the object and a field level of the object.

4. The computer program product of claim 3, wherein the object is selectably mutable during runtime, thereby conserving memory using the object that is selectably mutable during runtime, whereby an owner of the object prevents a consumer of the object from modifying the object, without requiring the object to be copied in memory, and wherein each of the owner and the consumer comprises respective code.

5. A system to conserve memory by supporting objects that are selectably mutable during runtime, the system comprising:
   one or more computer processors; and
   a memory containing a program, which when executed by the one or more computer processors is configured to perform an operation comprising:
      in response to a first request to seal an object during runtime the object including one or more attributes safeguarding against modification of the object, by sealing the object such that an exception is thrown upon any attempt to modify any of the one or more attributes of the sealed object; and in response to a second request to unseal the sealed object during runtime wherein the first and second requests each specify a respective key, and upon determining that the keys match, unsealing the sealed object such that no exception is thrown upon any attempt to modify any of the one or more of the attributes of the unsealed object;

wherein an exception is thrown upon determining that the keys do not match;

wherein modification of the object is prevented without having to declare the object as mutable or immutable during compile-time, and while avoiding any memory cost associated with performing defensive copying of the object; wherein selectable mutability of the object is implemented using a predefined seal annotation selected from a runtime seal annotation and a compile-time seal annotation, wherein the predefined seal annotation is applied at a predetermined level selected from a class level of the object and a field level of the object.

6. The system of claim 5, wherein the object is selectably mutable during runtime, thereby conserving memory using the object that is selectably mutable during runtime, whereby an owner of the object prevents a consumer of the object from modifying the object, without requiring the object to be copied in memory, and wherein each of the owner and the consumer comprises respective code.

7. The system of claim 6, wherein modification of the object is, in a first instance, prevented for a software cache that supports dual-state objects comprising objects having dual states including a mutable state and an immutable state, thereby reducing memory consumption of the software cache, at least relative to not supporting dual-state objects in the software cache, wherein the sealed object is in the immutable state, wherein the unsealed object is in the mutable state, wherein the first request is received from the owner of the object, wherein the attempt to modify one or more attributes of the sealed object is, in respective instances, made by: (i) the owner of the object and (ii) the consumer of the object; wherein modification of the object is, in a second instance, prevented when the object is passed as an argument corresponding to a parameter of an invoked method, thereby preventing modification of the argument by the invoked method and rendering the object intact for an entity invoking the method, wherein the entity comprises code, wherein the exception is, in respective instances, thrown by: (i) a virtual machine and (ii) an object-oriented application for the virtual machine.

8. The system of claim 7, wherein a first type of exception comprising an object-sealed exception is thrown upon any attempt to modify any of the one or more attributes of the sealed object, wherein a second type of exception comprising an object-already-sealed exception is thrown upon any attempt to seal the sealed object, regardless of any token provided, wherein a third type of exception comprising a key-mismatch exception is thrown upon any attempt to unseal the sealed object using a key that does not match the key previously used in sealing the object, wherein a fourth type of exception comprising an object-not-sealed exception is thrown upon any attempt to unseal the unsealed object, wherein no exception is thrown upon any attempt to unseal the sealed object using a key that matches the key previously used in sealing the object, whereupon no exception is thrown upon the unsealed object being modified, wherein the key previously used in sealing the object is, in respective instances, generated by: (i) a predefined random function and (ii) a predefined pseudorandom function.

9. The system of claim 8, wherein modification of the object is prevented at least in part by an application programming interface (API) having a sealable interface and a plurality of classes including: (i) a sealable-adapter class implementing the sealable interface; (ii) an object-sealed-exception class used by the sealable-adapter class; (iii) a key-mismatch-exception class used by the sealable-adapter class, an object-already-sealed-exception class used by the sealable-adapter class; and (iv) an object-not-sealed-exception class used by the sealable-adapter class; wherein the object is an instance of a user-defined class that inherits from the sealable-adapter class, whereby the user-defined class is a subclass of the sealable-adapter class.

10. The system of claim 9, wherein the sealable interface and the sealable-adapter class each include: (i) a seal method having a string formal parameter; (ii) an unseal method having a string formal parameter; (iii) an is-sealed method having no formal parameter; and (iv) the handle-mutation method, which has no formal parameter; wherein the sealable-adapter class further includes: (i) a sealed boolean attribute that is initialized to false and that represents whether a given object that is an instance of the sealable-adapter class is sealed; (ii) a key string attribute representing a given key with which the given object is sealed and (iii) a clone method that creates an unsealed, deep copy of the given object; wherein the user-defined class includes: (i) at least one attribute not included in the sealable-adapter class and (ii) at least one method not included in the sealable-adapter class; wherein the object-sealed-exception class includes a sealable attribute representing a given sealed object, wherein modification of the object is prevented while still preserving support for dynamic polymorphism of the object.

11. The system of claim 10, wherein modification of the object is, in respective instances, prevented by:

(i) a first runtime annotation approach in which each setter method of the object and desired to conform to dual-state behavior is annotated by a pre-execute annotation that specifies a handle-mutation method, such that the pre-execute annotation is processed by a compiler plugin in order to invoke the handle-mutation method prior to executing the respective setter method of the object, wherein the handle-mutation method raises throws the exception upon any attempt by the respective setter method to modify any of the one or more attributes of the sealed object, wherein the pre-execute annotation is reflective, wherein at least one non-setter method of the object is not annotated by the pre-execute annotation; and (ii) a compile-time code introduction approach in which source code pertaining to each desired setter method of the object is modified to invoke the handle-mutation method at the beginning of the respective desired method of the object, wherein at least one non-setter method of the object is not modified to invoke the handle-mutation method.

12. The system of claim 11, wherein modification of the object is, in respective instances, prevented by:

(iii) a second runtime annotation approach without requiring any compiler changes and regardless of any access specifier of any field in the object including public, private, and protected access specifiers, and in which a seal annotation is applied at a class level of the object such that each field of the object exhibits dual-state behavior;

(iv) a third runtime annotation approach without requiring any compiler changes and regardless of any access specifier of any field in the object including public, private, and protected access specifiers, and in which the seal annotation is applied at a field level of the object such that one or more desired fields of the object exhibit dual-state behavior and such that at least one field of the object does not exhibit dual-state behavior; and (v) a compile-time field-level annotation approach in which the seal annotation is applied at the field level of the object and not at the class level of the object and in which the compiler is modified to invoke the handle-mutation method before executing each put-field operation, and without modifying any runtime environment associated with the compiled code.

* * * * *